UNITED STATES PATENT OFFICE.

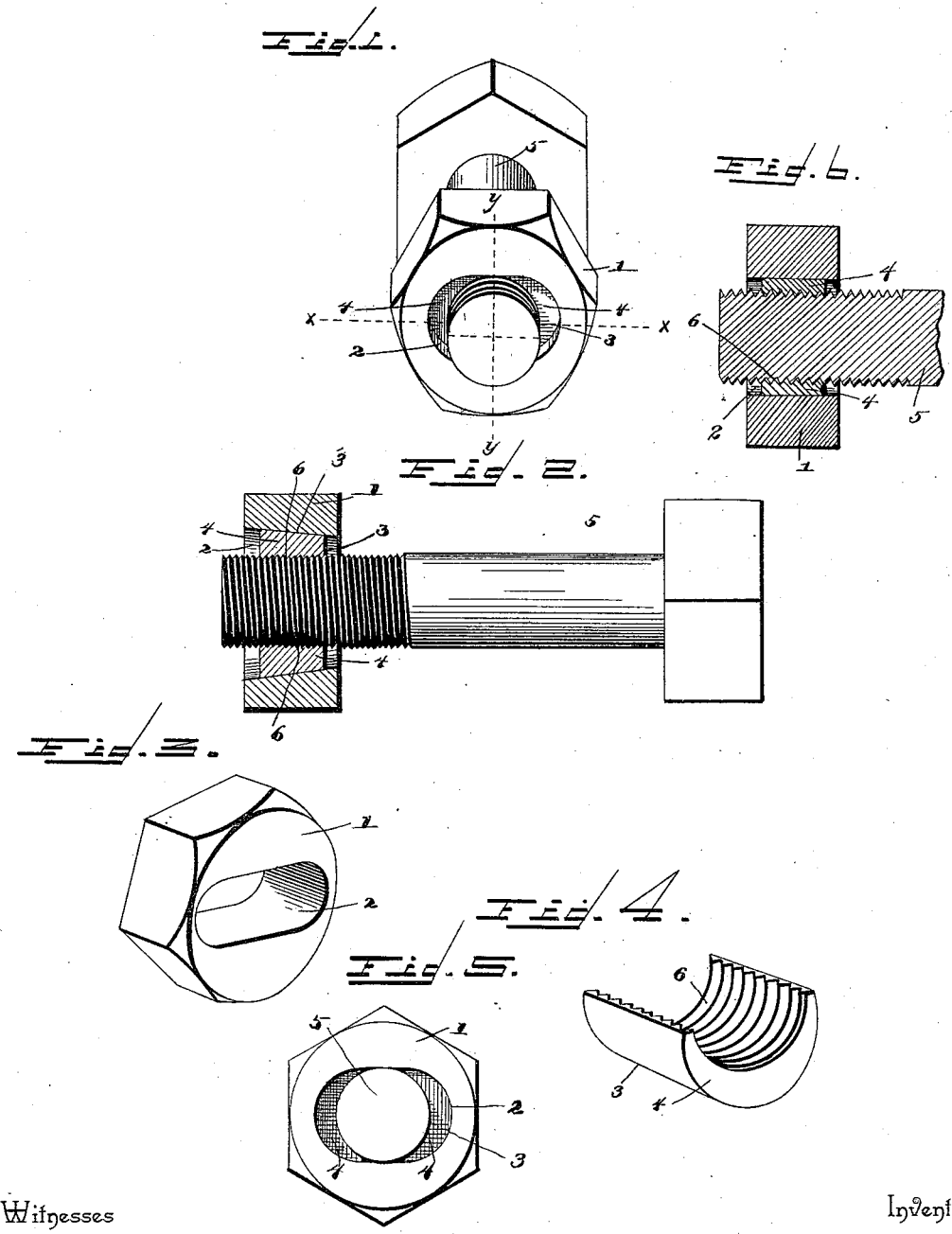

DANIEL RHODES, OF ALTOONA, PENNSYLVANIA.

NUT-LOCK.

SPECIFICATION forming part of Letters Patent No. 451,072, dated April 28, 1891.

Application filed January 8, 1890. Serial No. 336,284. (No model.)

*To all whom it may concern:*

Be it known that I, DANIEL RHODES, a citizen of the United States, residing at Altoona, in the county of Blair and State of Pennsylvania, have invented a new and useful Nut-Lock, of which the following is a specification.

The invention relates to improvements in nut-locks.

The object of the present invention is to provide a nut-lock of simple and economic construction adapted to readily engage the ordinary construction of bolt and securely clamp the same and be automatically locked as it is screwed against a fish-plate or some other opposing surface.

The invention consists in the construction and novel combination and arrangement of parts hereinafter fully described, illustrated in the accompanying drawings, and pointed out in the claim hereto appended.

In the drawings, Figure 1 is a perspective view of a bolt provided with a locking-nut constructed in accordance with the invention. Fig. 2 is a longitudinal sectional view on the line $x$ $x$ of Fig. 2, the nut and sectional bushing or lining being shown in section and the bolt being shown in elevation. Fig. 3 is a detail view of the nut. Fig. 4 is a similar view of the sectional bushing or lining. Fig. 5 is a plan view of the nut and bolt. Fig. 6 is a transverse section on the line $y$ $y$ of Fig. 1.

1 designates the nut, the exterior of which is made polygonal, so that it may be operated upon by any ordinary wrench. The nut is provided with an elliptical opening 2, considerably longer than the diameter of the bolt 5 and slightly wider than said diameter, the wall of the opening at the ends of the ellipse being inclined outwardly or flared toward the outer face of the nut, and the longer sides of the ellipse being straight and not tapered and the entire wall perfectly plain, smooth, and unbroken.

4 designates a pair of bushing-sections which are semicircular, or nearly so, and screw-threaded, as at 6. These sections are thin and straight at their opposite edges, so as to approximate the shape and size of the elliptical opening at its narrowest sides, and the thickness of the bushing-sections is increased considerably toward their middles, so that they are crescent shape in cross-section and at and near said middles are tapered or reduced toward their inner ends, as at 3, in contradistinction to the inclined end walls of the elliptical opening. In practice it is proposed generally to cast the bushing-sections, thereby securing economy and dispatch in their manufacture; but whether cast or otherwise formed the construction described will be found advantageous.

In operation the bolt is first passed through the bolt-opening, after which the nut is introduced over the threaded end thereof. The two bushing-sections are now applied to opposite sides of the bolt and the nut drawn forward, so that the elliptical opening therein receives the bushings. The nut is now rotated and in turn rotates the bushings. When the nut reaches the contacting-surface and is revolved, the bushing-sections, being farther revolved, begin to wedge their inclined faces against the oppositely-inclined faces at the ends of the elliptical opening, so that said faces act to tightly and immovably clamp the bushings upon diametrically-opposite sides of the bolt.

It will be observed that the compression of the bushing-sections will only be at the points where the two oppositely-inclined faces of the bushing and the nut meet, which is opposite the thickened portions of the bushing-sections, and the said sections are thereby provided for against becoming broken or fractured by the excessive pressure produced by the wedge-like action of the two inclined faces. The bushing 3 extends to within a short distance of the inner face of the nut, but allows sufficient room for compression, for were the sections of the lining or bushing sufficiently long to extend to the inner face of the nut they would themselves contact with the opposing surface and prevent the nut riding upon them and being locked.

From the foregoing description and the accompanying drawings it will readily be seen that the nut-lock is simple and inexpensive and is adapted to securely clamp the bolt and retain the nut in position without injuring the threads of the nut or the sections of the lining or bushing.

If desired, in applying the lock I may utilize what I term a "jam-nut." (Not shown.) In such use the parts are assembled in position, as heretofore mentioned, and the jam-nut screwed down against the nut. By continuing the rotations of the jam-nut the main nut is driven back, so that it acts to clamp the two clamping-sections without any rotation of the same, so that while their positions upon the bolt remain unchanged they may be easily locked.

Having described my invention, what I claim is—

The pair of opposite bushing-sections, crescent shape in cross-section, the interiors of said sections being provided with segments of screw-threads and their exteriors only at their ends or thickest parts made conical or tapered, and the polygonal nut provided with an elliptical opening adapted to loosely fit the bushings, said opening having its internal wall made plain or unbroken and only at its ends inclined oppositely to the external walls of the bushings, substantially as specified.

In testimony that I claim the foregoing as my own I have hereto affixed my signature in presence of two witnesses.

DANIEL RHODES.

Witnesses:
W. H. WEBER,
ROBT. JOHNSON.